United States Patent
Evans et al.

(10) Patent No.: US 6,921,431 B2
(45) Date of Patent: Jul. 26, 2005

(54) THERMAL PROTECTIVE COATING FOR CERAMIC SURFACES

(75) Inventors: Timothy G. Evans, Harrisonburg, VA (US); John W. Olver, Blacksburg, VA (US); John G. Dillard, New Castle, VA (US); Jason Andrew Simmons, Blacksburg, VA (US); Rex Allen Churchward, Flaorianopolis, SC (US)

(73) Assignee: Wessex Incorporated, Blacksburg, VA (US)

( * ) Notice: Subject to any disclaimer, the term of this patent is extended or adjusted under 35 U.S.C. 154(b) by 106 days.

(21) Appl. No.: 10/657,850

(22) Filed: Sep. 9, 2003

(65) Prior Publication Data

US 2005/0051057 A1 Mar. 10, 2005

(51) Int. Cl.$^7$ ................................. C09D 5/18
(52) U.S. Cl. ............... 106/287.34; 106/286.4; 106/286.5; 106/286.7; 106/286.8; 106/372.2; 106/600; 106/612; 106/626; 106/628; 106/632; 106/635; 106/792; 106/793; 106/799; 106/801; 252/70; 428/688; 428/689; 428/697; 428/698; 428/703
(58) Field of Search ............... 106/286.4, 286.5, 106/286.7, 286.8, 287.34, 372.2, 600, 612, 626, 628, 632, 635, 792, 793, 799, 801; 428/688, 689, 697, 698, 703; 252/70

(56) References Cited

U.S. PATENT DOCUMENTS

| | | | |
|---|---|---|---|
| 4,072,530 A | | 2/1978 | Hirame et al. |
| 4,469,721 A | * | 9/1984 | Shioya .................... 427/397.8 |
| 4,810,300 A | | 3/1989 | Holcombe, Jr. et al. |
| 5,296,288 A | | 3/1994 | Kourtides et al. |
| 5,569,427 A | * | 10/1996 | Semenova et al. .......... 264/129 |
| 5,668,072 A | | 9/1997 | Holcombe, Jr. et al. |
| 6,007,873 A | | 12/1999 | Holcombe, Jr. et al. |
| 6,444,271 B2 | | 9/2002 | Wittenauer et al. |

* cited by examiner

*Primary Examiner*—David Sample
*Assistant Examiner*—S. S. Manlove
(74) *Attorney, Agent, or Firm*—Johnston, Holroyd & Associates; Mary-Jacq Holroyd

(57) ABSTRACT

A coating admixture, method of coating and substrates coated thereby, wherein the coating contains colloidal silica, colloidal alumina, or combinations thereof; a filler such as silicon dioxide, aluminum oxide, titanium dioxide, magnesium oxide, calcium oxide and boron oxide; and one or more emissivity agents such as silicon hexaboride, carbon tetraboride, silicon tetraboride, silicon carbide, molybdenum disilicide, tungsten disilicide, zirconium diboride, cupric chromite, or metallic oxides such as iron oxides, magnesium oxides, manganese oxides, chromium oxides, copper chromium oxides, cerium oxides, terbium oxides, and derivatives thereof. In a coating solution, an admixture of the coating contains water. A stabilizer such as bentonite, kaolin, magnesium alumina silicon clay, tabular alumina and stabilized zirconium oxide is also added.

32 Claims, No Drawings

THERMAL PROTECTIVE COATING FOR CERAMIC SURFACES

FIELD OF THE INVENTION

The present invention relates to a protective coating for use on a ceramic substrate, and more particularly to a thermal protective coating, and ceramic substrates coated therewith, which coating provides excellent resistance to high temperatures and repeated thermal shock at elevated temperatures.

BACKGROUND OF THE INVENTION

Protective coatings for use on numerous substrates are known in the prior art. For example, U.S. Pat. No. 5,296,288, the contents of which are incorporated herein by reference in its entirety, issued on Mar. 22, 1994 describes a protective coating for ceramic materials and a thermal control structure comprising a ceramic material having the protective coating thereon. The protective coating includes, in admixture, silicon dioxide powder, colloidal silicon dioxide, water and one or more emittance agent(s) selected from the group consisting of silicon tetraboride, silicon hexaboride, silicon carbide, molybdenum disilicide, tungsten disilicide, and zirconium diboride. The invention therein has the drawback that the coating must be used immediately after the composition is prepared.

Prior efforts have been made to generate protective coatings having high emissivity characteristics for use on metal surfaces. U.S. Pat. Nos. 5,668,072 ('072) and 6,007,873 ('873) issued respectively on Sep. 16, 1997 and Dec. 28, 1999 teaches a high emissivity coating composition, and methods of use for coating the interior of furnaces, in which the coating composition includes a high emissivity agent such as a rare earth oxide and a binder agent. The preferred emissivity agent is cerium oxide or related agents including mixed oxides of cerium oxide and precursors. Terbium may be substituted for cerium. The binder, which also is used as a suspension agent, includes an aluminum phosphate solution, peptized aluminum oxide monohydrate and ethyl alcohol. The inventions of '072 and '873 make use of organic substances potentially increasing the amount of fumes generated during heating.

U.S. Pat. No. 4,810,300 ('300) issued on Mar. 7, 1989 discloses a composition to produce an adherent and water insoluble deposit on substrate surfaces, which deposit is used for inks, paints and the like. The coating material for the substrate surfaces includes at least water, a pre-reacted lithium silicate and an unreacted lithium hydroxide monohydrate. Preferably, the liquid phase contains a dispersant in the form of clay. A suitable pigment or other refractory material such as graphite, oxides, borides, nitrides, carbides, sulfides, metals and mixtures thereof may also be incorporated therein. The effective temperature range of the coating material is up to about 2000° C. The '300 invention adheres to metal surfaces but does not provide thermal protection to the underlying surface.

U.S. Pat. No. 5,569,427 ('427) issued on Oct. 29, 1996 describes a high temperature coating for use on a ceramic substrate and a non-firing process for obtaining the high temperature coating. The coating comprises a silica taken from a silica sol, an alumina, a silicon carbide and a molybdenum disilicide. The coating has an operating temperature up to 1500° C. The coating of '427 is used immediately after being prepared, and is formulated for ceramic substrate surfaces.

U.S. Pat. No. 6,444,271 ('271) issued on Sep. 3, 2002 discloses a durable refractory ceramic coating having a silicide coating comprising a refractory metal and silicon, which combines to form a silicide. The coating described therein is at least partially diffused into the base structure of at least one surface. The base structure is a ceramic material, which is preferably a ceramic oxide material. The invention of '271 uses a polymeric stock solution for a carrier to apply the coating thereby potentially increasing the flammable nature of the stock solution.

It is also known to use bentonite in heat resistant coatings. U.S. Pat. No. 4,072,530 issued on Feb. 7, 1978 teaches a refractory furnace wall coating composition containing silicon carbide, a stabilized zirconium oxide or bentonite, a silicon dioxide, a hydrolyzate of poly(ethyl silicate), a sodium silicate or aluminum phosphate and water.

None of the above inventions and patents, taken either singularly or in combination, is seen to describe the instant invention as claimed.

SUMMARY OF THE INVENTION

The present invention relates to a thermal protective coating which contains colloidal silica, a filler such as a fine particle size refractory material, one or more emissivity agents, and a stabilizer. The filler is taken from the group consisting of silicon dioxide, aluminum oxide, titanium dioxide, magnesium oxide, calcium oxide and boron oxide. The emissivity agents can be silicon hexaboride, carbon tetraboride, silicon tetraboride, silicon carbide, molybdenum disilicide, tungsten disilicide, zirconium diboride, cupric chromite, or metallic oxides such as iron oxides, magnesium oxides, manganese oxides, copper chromium oxides and other chromium oxides, and derivatives thereof. A large molecule clay stabilizer is added such as bentonite or kaolin. In a coating solution according to the present invention, an admixture of the thermal protective coating contains colloidal silica, a filler, one or more emissivity agents, a stabilizer, and water. The stabilizer is added to extend the shelf life of the coating solution. A colorant may be added to form a thermal protective paint. Colloidal alumina may be added to, or substituted for, the colloidal silica.

The present invention may be used to coat a variety of refractory materials which are composed of ceramic compounds. The coating provides a means to re-radiate heat during exposure to temperatures ranging from 1200° F. to 3500° F. Some prime candidates are refractory bricks composed of compressed ceramic fibers and various flexible composites that contain cloths woven from ceramic fiber. The coating is capable of sustaining repeated thermal shock without degradation, and has proven to prolong the working life of crucibles, incinerators, insulations, metallurgical furnaces and reusable ceramic furniture that are subjected to conditions of elevated temperatures. The coating may be applied to ceramic cloth substrates, which are typically used for welding and fire blankets, and may also be used is sealing and insulation applications. The coating contains one or more emissivity agents, crystalline compounds and an amorphous matrix which constitutes a thermal protective system that has many potential uses. The coating has reduced surface temperatures from 300° F. to as high as 1000° F. Subsequently, the temperature of the back face versus the front face of a coated substrate has been reduced by as much as 700° F.

An aspect of the present invention is to provide a thermal protective coating that has an extended shelf life. The addition of a stabilizer permits a coating solution, according to the present invention, to be prepared and used at a later date.

Another aspect of the present invention is to provide a thermal protective coating that improves the optical properties, namely by increasing the emissitivity of the coated substrate, which improves the radiative thermal transfer and reduces catalytic efficiency of ceramic substrate materials at temperatures substantially higher than the substrate materials' melting point or thermal dissociation point. This protection permits the substrate materials' exposure to higher thermal conditions than would normally be permitted by the uncoated substrate thereby extending the substrate materials' useful range of thermal conditions.

A related aspect of the present invention is that the thermal protective coating extends the useful life of ceramic materials. The present invention is more cost efficient than uncoated ceramics. For example, ceramic bricks that are utilized in metallurgical furnaces under go constant degradation and require replacement. The replacement of these ceramic materials is costly. Ceramic bricks coated with the present invention require less frequent replacement resulting in significant reduction in the cost of operating a given furnace.

The thermal protective coating of the present invention decreases the catalytic efficiency of the surface. The low catalytic efficiency is due to the low thermal conductivity and the high emissivity characteristics of the coating. It provides a means to re-radiate more thermal energy to the surrounding area rather than transfer it to the underlying substrate. This aspect of the present invention provides thermal protection for coated ceramic substrates.

Furthermore, another aspect of the present invention is that it is able to increase performance temperatures for all kinds of nonmetallic substrates, including, but not limited to, woven ceramics, ceramic fibers, ceramic bulk fibrous materials, solid or pressed ceramics, and combinations thereof. Furthermore, the present invention provides an increased resistance to abrasion and corrosion when applied to structures such as engines, turbines, ductwork, refractories, and other ceramic applications.

Another aspect of the present invention is to provide a thermal protective coating that does not produce toxic fumes when heated. The thermal protective coating may be applied to furnace refractory surfaces in the field, and is 100% inorganic. The thermal protective coating of the present invention, therefore, does not produce toxic fumes when heated, and may be safely applied to ceramic surfaces in the field as desired.

Yet another aspect of the present invention is to provide a thermal protective coating that does not significantly increase the weight of the coated substrate.

These and other aspects of the present invention will become readily apparent upon further review of the following specification.

DETAILED DESCRIPTION OF PREFERRED EMBODIMENTS

The present invention relates to a thermal protective coating, which contains from about 5% to about 35% of colloidal silica, from about 23% to about 79% of a filler, from about 2% to about 20% of one or more emissivity agents, and from about 1.5% to about 5.0% of a stabilizer in a dry admixture. In a coating solution according to the present invention, a wet admixture of the thermal protective coating contains from about 15% to about 45% of colloidal silica, from about 23% to about 55% of a filler, from about 1% to about 10% of one or more emissivity agents, from about 0.5% to about 2.5% of a stabilizer and from about 18% to about 40% water. The wet admixture coating solution contains between about 40% and about 70% total solids.

As used herein, all percentages (%) are percent weight-to-weight, also expressed as weight/weight %, %(w/w), w/w, w/w % or simply %, unless otherwise indicated. Also, as used herein, the terms "wet admixture" refers to relative percentages of the composition of the thermal protective coating in solution and "dry admixture" refers to the relative percentages of the composition of the dry thermal protective coating mixture prior to the addition of water. In other words, the dry admixture percentages are those present without taking water into account. Wet admixture refers to the admixture in solution (with water). "Wet weight percentage" is the weight in a wet admixture, and "dry weight percentage" is the weight in a dry admixture without regard to the wet weight percentages. The term "total solids", as used herein, refers to the total sum of the silica/alumina and the alkali or ammonia ($NH_3$), plus the fraction of all solids including impurities. Weight of the solid component divided by the total mass of the entire solution, times one hundred, yields the percentage of "total solids".

The colloidal silica is preferably a mono-dispersed distribution of colloidal silica, and therefore, has a very narrow range of particle sizes. The filler is preferably a fine particle size refractory material taken from the group consisting of silicon dioxide, aluminum oxide, titanium dioxide, magnesium oxide, calcium oxide and boron oxide. The emissivity agent(s) is (are) preferably taken from the group consisting of silicon hexaboride, boron carbide (also known as carbon tetraboride), silicon tetraboride, silicon carbide, molybdenum disilicide, tungsten disilicide, zirconium diboride, cupric chromite, and metallic oxides such as iron oxides, magnesium oxides, manganese oxides, copper chromium oxides, chromium oxides, cerium oxides, and terbium oxides, and derivatives thereof. The copper chromium oxide, as used in the present invention, is a mixture of cupric chromite and cupric oxide. The stabilizer may be taken from the group consisting of bentonite, kaolin, magnesium alumina silica clay, tabular alumina and stabilized zirconium oxide. The stabilizer is preferably bentonite. Other ball clay stabilizers may be substituted herein as a stabilizer. Colloidal alumina, in addition to or instead of colloidal silica, may also be included in the admixture of the present invention. When colloidal alumina and colloidal silica are mixed together one or the other requires surface modification to facilitate mixing, as is known in the art.

Coloring may be added to the protective coating of the present invention to form a heat resistant paint. Inorganic pigments may be added to the protective coating to form a heat resistant paint without generating toxic fumes. In general, inorganic pigments are divided into the subclasses: colored (salts and oxides), blacks, white and metallic. Suitable inorganic pigments include but are not limited to yellow cadmium, orange cadmium, red cadmium, deep orange cadmium, orange cadmium lithopone and red cadmium lithopone.

A preferred embodiment of the present invention contains a dry admixture of from about 10.0% to about 30.0% colloidal silica, from about 50% to about 79% silicon dioxide powder, and from about 2% to about 15% of one or more emittance agent(s) taken from the group consisting of cerium oxide, boron silicide, boron carbide, silicon tetraboride, silicon carbide molybdenum disilicide, tungsten disilicide, zirconium diboride, and from about 1.5% to about 5.0% bentonite powder. The corresponding coating in solution (wet admixture) for this embodiment contains from about 20.0% to about 35.0% colloidal silica, from about 25.0% to about 55.0% silicon dioxide, from about 18.0% to about 35.0% water, and from about 2.0% to about 7.5% one or more emittance agent(s), and from about 0.50% to about 2.50% bentonite powder. Preferably deionized water is used. Preferred embodiments of the wet admixture have a total solids content ranging from about 50% to about 65%.

A most preferred thermal protective coating of the present invention contains a dry admixture from about 15.0% to about 25.0% colloidal silica, from about 68.0% to about 78.0% silicon dioxide powder, about 2.00% to about 4.00% bentonite powder, and from about 4.00% to about 6.00% of an emittance agent. The emittance agent is taken from one or more of the following: zirconium boride, boron silicide, and boron carbide.

A most preferred wet admixture contains about 27.0% colloidal silica based on a colloidal silica solids content of about 40%, from about 25% to about 50% silicon dioxide powder, about 1.50% bentonite powder, and from about 2.50% to about 5.50% of an emittance agent, with the balance being water. The emittance agent is most preferably taken from the group consisting of zirconium boride, boron silicide, and boron carbide. Preferred embodiments include those where the emittance agent comprises about 2.50% zirconium diboride, about 2.50% boron silicide, or from about 2.50% to about 7.50% boron carbide. The pH of a most preferred wet admixture according to the present invention is about 9.0±1.0, the specific gravity is about 1.40 to 1.50 and the total solids content is about 50% to 60%.

Ludox (trademark) TM 50 colloidal silica and Ludox (trademark) AS 40 colloidal silica are available from Grace Davidson (of Columbia, Md.). The particles in Ludox (trademark) colloidal silica are discrete uniform spheres of silica which have no internal surface area or detectable crystallinity. Most are dispersed in an alkaline medium which reacts with the silica surface to produce a negative charge. Because of the negative charge, the particles repel one another resulting in stable products. Although most grades are stable between pH 8.5–11.0, some grades are stable in the neutral pH range. Ludox (trademark) colloidal silicas are aqueous colloidal dispersions of very small silica particles. They are opalescent to milky white liquids. Because of their colloidal nature, particles of Ludox (trademark) colloidal silica have a large specific surface area which accounts for the novel properties and wide variety of uses. Ludox (trademark) colloidal silica is available in two primary families: mono-dispersed, very narrow particle size distribution of Ludox (trademark) colloidal silica and poly-dispersed, broad particle size distribution of Ludox (trademark) P. The Ludox (trademark) colloidal silica is converted to a dry solid, usually by gelation. The colloidal silica can be gelled by (1) removing water, (2) changing pH, or (3) adding a salt or water-miscible organic solvent. During drying, the hydroxyl groups on the surface of the particles condense by splitting out water to form siloxane bonds (Si—O—Si) resulting in coalescence and interbonding. Dried particles of Ludox (trademark) colloidal silica are chemically inert and heat resistant. The particles develop strong adhesive and cohesive bonds and are effective binders for all types of granular and fibrous materials, especially when use at elevated temperature is required.

The filler may be a silicon dioxide powder such as Min-U-Sil (trademark) 5 silicon dioxide available from U.S. Silica (of Berkeley Springs, W.Va.). This silicon dioxide is fine ground silica. Chemical analysis of the Min-U-Sil (trademark) silicon dioxide indicates contents of 98.5% silicon dioxide, 0.060% iron oxide, 1.1% aluminum oxide, 0.02% titanium dioxide, 0.04% calcium oxide, 0.03% magnesium oxide, 0.03% sodium dioxide, 0.03% potassium oxide and a 0.4% loss on ignition. The typical physical properties are a compacted bulk density of 41 lbs/ft$^3$, an uncompacted bulk density of 36 lbs/ft$^3$, a hardness of 7 Mohs, hegman of 7.5, median diameter of 1.7 microns, an oil absorption (D-1483) of 44, a pH of 6.2, 97%–5 microns, 0.005%+325 Mesh, a reflectance of 92%, a 4.2 yellowness index and a specific gravity of 2.65.

Emittance agents are available from several sources. Emissivity is the relative power of a surface to emit heat by radiation, and the ratio of the radiant energy emitted by a surface to the radiant energy emitted by a blackbody at the same temperature. Emittance is the energy radiated by the surface of a body per unit area.

The boron carbide, also known as carbon tetraboride, which may be used as an emissivity agent in the present invention, is sold as 1000W boron carbide and is available from Electro Abrasives (of Buffalo, N.Y.). Boron carbide is one of the hardest man made materials available. Above 1300° C., it is even harder than diamond and cubic boron nitride. It has a four point flexural strength of 50,000–70,000 psi and a compressive strength of 414,000 psi, depending on density. Boron carbide also has a low thermal conductivity (29–67 W/mK) and has electrical resistivity ranging from 0.1–10 ohm-cm. Typical chemical analysis indicates 77.5% boron, 21.5% carbon, iron 0.2% and total boron plus carbon is 98%. The hardness is 2800 Knoop and 9.6 Mohs, the melting point is 4262° F. (2350° C.), the oxidation temperature is 932° F. (500° C.), and the specific gravity is 2.52 g/cc.

1000W green silicon carbide (SiC), an optional emissivity agent, is also available from Electro Abrasives. Green silicon carbide is an extremely hard (Knoop 2600 or Mohs 9.4) man made mineral that possesses high thermal conductivity (100 W/m-K). It also has high strength at elevated temperatures (at 1100° C., Green SiC is 7.5 times stronger than $Al_2O_3$). Green SiC has a Modulus of Elasticity of 410 GPa, with no decrease in strength up to 1600° C., and it does not melt at normal pressures but instead dissociates at 2815.5° C. Green silicon carbide is a batch composition made from silica sand and coke, and is extremely pure. The physical properties are as follows for green silicon carbide: the hardness is 2600 Knoop and 9.4 Mohs, the melting point is 4712° F. (2600° C.), and the specific gravity is 3.2 g/cc. The typical chemical analysis is 99.5% SiC, 0.2% $SiO_2$, 0.03% total Si, 0.04% total Fe, and 0.1% total C. Commercial silicon carbide and molybdenum disilicide may need to be cleaned, as is well known in the art, to eliminate flammable gas generated during production.

Boron silicide ($B_6Si$) (Item# B-1089) is available from Cerac (of Milwaukee, Wis.). The boron silicide, also known as silicon hexaboride, available from Cerac has a −200 to −325 mesh (about 2 to 6 microns average) and a typical purity of about 98%. Zirconium boride ($ZrB_2$) (Item# Z-1031) is also available from Cerac with a typical average of 10 microns or less (−325 mesh), and a typical purity of about 99.5%.

The admixture of the present invention preferably includes bentonite powder, tabular alumina, or other magnesium alumina silica clay as the stabilizer. The bentonite powder permits the present invention to be prepared and used at a later date. The examples provided for the present invention include PolarGel bentonite powder (Item# 354) available from Whittaker Clark & Daniels (of South Plainfield, N.J.). Technical grade bentonite is generally used for the purpose of suspending, emulsifying and binding agents, and as rheological modifiers. The typical chemical analysis is 59.00% to 61.00% of silicon dioxide ($SiO_2$), 20.00% to 22.00% of aluminum oxide ($Al_2O_3$), 2.00% to 3.00% calcium oxide (CaO), 3.50% to 4.30% magnesium oxide (MgO), 0.60% to 0.70% ferric oxide ($Fe_2O_3$), 3.50% to 4.00% sodium oxide ($Na_2O$), 0.02% to 0.03% potassium oxide ($K_2O$), and 0.10% to 0.20% titanium dioxide and a maximum of 8.0% moisture. The pH value ranges from 9.5 to 10.5. Typical physical properties are 83.0 to 87.0 dry brightness, 2.50 to 2.60 specific gravity, 20.82 pounds/solid gallon, 0.0480 gallons for one pound bulk, 24 ml minimum swelling power, maximum 2 ml gel formation, and 100.00% thru 200 mesh. Tabular alumina (Alumina Tab T64 Item 635) and magnesium alumina silica clay (Mag Alum Sil Technical Item 105) are also available from Whittaker Clark & Daniels.

Colorants, which may be added to the present invention, include but are not limited to inorganic pigments. Suitable inorganic pigments, such as yellow iron oxide, chromium oxide green, red iron oxide, black iron oxide, titanium dioxide, are available from Hoover Color Corporation. Additional suitable inorganic pigments, such as copper chromite black spinel, chromium green-black hematite, nickel antimony titanium yellow rutile, manganese antimony titanium buff rutile, and cobalt chromite blue-green spinel, are available from The Shepherd Color Company (of Cincinnati, Ohio).

The thermal protective coating of the present invention is prepared by placing the liquid ingredients in a clean, relatively dry mixing container. While mixing, the remaining ingredients are added slowly to the mixture to prevent the powders from clumping and sticking to the side of the mixing container. The mixture is then mixed at high power, such as 5000 rpm, for at least 20 minutes depending on the configuration of the mixer. Preferably, a high shear impeller blade, such as a high shear saw toothed blade, is used wherein the mixing is performed at revolutions ranging from about 3000 rpm to about 5000 rpm. A ball milling or bead milling apparatus may be used in lieu of a conventional mixer having a blade.

The solids in the thermal protective coating admixture may settle during shipment or storage. Prior to use, the admixture may be thoroughly re-mixed to ensure settled solids and clumps are completely redispersed. For 500 ml containers and larger, use a flat high speed/high shear blade, attach the blade to a hand drill, drill press or mixer motor with chuck, and mix at high speed (3000 rpm or higher) while moving the blade up and down inside the container to hit and break down settled clumps. To ensure complete dispersion, the admixture should be remixed for 10 to 15 minutes. A manual paint paddle may be used to stir the wet admixture in the container and verify that mixing and dispersion are complete. Small containers can be shaken by hand for 5 minutes, and stirred with a paint stick to ensure settled clumps are dispersed and homogeneous.

The present invention is frequently applied to a substrate surface in the field. The substrate surface may be a ceramic brick, ceramic tile, ceramic fiber, ceramic cloth or the like. The coating may be applied wet and allowed to air dry or heat dry. The ceramic substrates may be the internal ceramic surfaces of refractory furnaces, ceramic automotive, marine or aerospace parts, and any other ceramic surface that may be subjected to high temperatures.

Initially, a ceramic surface should be cleaned of all dirt, loose material, surfactants, oils, and the like. When possible, ceramic surfaces to be coated should be roughened by sand ($SiO_2$)/grit blasting with a coarse media, followed by removal of loose particles with a brush or air gun. The surface of some ceramic substrates may be grit blasted with a silica sand coarse media or an amorphous blasting media, such as Black Beauty (trademark) slag, as necessary. Black Beauty is a registered trademark of Harsco Corporation. The method of grit blasting the ceramic substrate is not limited to silica sand coarse media and the like, but encompasses any equivalent alternative method. The preferred blasting media will vary with refractory type.

All substrates should be baked or cured per the substrate manufacturer's recommendations. If unavailable, heating to a minimum of 930° F. for one hour to remove moisture, chemical additives and oily deposits is recommended. The coating should be applied to the substrate as soon as possible following any cleaning, subsequent drying, or once the substrate has reached room temperature in the event of any prior heat treatment procedure.

The coating admixture can be applied using a spray gun or a brush depending on the desired application. The spray gun method is generally used for pressed fiber ceramics/refractories, and may be used for ceramic cloth fiber applications. A high volume low-pressure spray gun is a preferred method of applying the coating to a substrate. It is desirable to use 5 to 10 psi clean oil free air pressure and a 1 mm nozzle. The spray gun flow and air settings are set to achieve a uniform coating coverage at the desired densities according to intended application.

The coating may be applied using a brush. The brush method is generally used for permeable and non-permeable ceramics/refractories. A fine, nylon bristle type brush may be used. The coating is applied with firm, even strokes, while trying to put the coating down with a single layer to avoid brushing the same area more than once. It is advisable to experiment on a test sample to achieve a uniform coating coverage. Whether a spray gun or brush is used, the ceramic substrate should be at room temperature, and spills and equipment should be cleaned immediately with water.

Controlling the coverage density of the product is desirable for an even coating that adheres to and protects the ceramic substrate. The desired coverage density is dependent upon porosity, coating solids content and other factors. Optimal coverage densities vary from 150 to 300 grams of dry coating weight per square meter of substrate surface area. Most substrates require an approximate coverage of 150 $ft^2$/gallon to 200 $ft^2$/gallon. The dry coating should not be thicker than approximately 1 to 10 mils for ceramic refractories. Thickness may be adjusted according to the use of the ceramic surface to be coated. Coatings thicker than desirable may peel, and not perform as well.

After the coating on the substrate has air dried for a minimum of two hours, the following curing process is recommended for optimal adhesion when coating a refractory surface. The temperature is increased at about 200° F. per hour until a peak temperature of about 1500° F. is reached. The peak temperature is maintained for about two hours. Following the two hours, the temperature is reduced to room temperature at a rate of up to two 200° F. per hour. The coating is then inspected for uniformity, and once the inspection is complete, the refractory substrate may be brought up to operating temperature per the refractory manufacturer's specifications.

Example 1 contains Ludox (trademark) TM 50 colloidal silica 29.3% dry weight and 28.6% wet weight based on Ludox (trademark) solids content of 50.0%, min-U-Sil (trademark) 5 $SiO_2$ powder 63.7% dry weight and 31.9% wet weight, an emissivity agent 4.03% dry weight and 2.00% wet weight wherein the emissivity agent is taken from the group consisting of boron carbide powder, green silicon carbide, zirconium boride, and boron silicide, and PolarGel bentonite powder (Item# 354) 2.91% dry weight and 1.40% wet weight, and 36.1% water, based on Ludox (trademark) solids content of 50.0%. The pH of example 1 is 8.5±1.0, and the total solids content is 50±0.3%. Example 1 is prepared by placing the liquid ingredients in a clean, relatively dry mixing container. While mixing, the remaining ingredients are added slowly to the mixture to prevent the powders from clumping and sticking to the side of the mixing container. The mixture is then mixed at high power for at least 20 minutes depending on the configuration of the mixer. The mixing was carried out in a high shear mixer with a 2.5-inch Cowles Hi-Shear Impeller blade with a 0.5 horsepower motor generating 7500 rpm without load.

Example 2 contains Ludox (trademark) TM 50 colloidal silica 29.3% dry weight and 28.6% wet weight based on Ludox (trademark) solids content of 50.0%, min-U-Sil (trademark) 5 SiO$_2$ powder 52.8% dry weight and 26.4% wet weight, boron carbide powder or silicon carbide powder 15.0% dry weight and 7.5% wet weight, PolarGel bentonite powder (Item# 354) 2.91% dry weight and 1.45% wet weight, and 36.1% water, based on Ludox (trademark) solids content of 50.0%. The pH of example 2 is 8.5±1.0, and the total solids content is 50±0.3%. Example 2 is prepared in the same fashion as example 1.

Example 3 contains Ludox (trademark) AS-40 colloidal silica 16.5% dry weight and 26.8% wet weight based on Ludox (trademark) solids content of 40%, min-U-Sil (trademark) 5 SiO$_2$ powder 76.3% dry weight and 49.6% wet weight, boron carbide powder or boron silicide powder 4.30% dry weight and 2.80% wet weight, PolarGel bentonite powder (Item# 354) 2.90% dry weight and 1.88% wet weight, and 18.9% water, based on Ludox (trademark) solids content of 40%. The pH of example 3 is 8.5±1.0, the specific gravity is 1.64±0.05 and the total solids content is 65±0.9%. Example 3 is prepared in the same fashion as example 1.

Example 4 contains Ludox (trademark) TM 50 colloidal silica 21.84% dry weight and 27.09% wet weight based on Ludox (trademark) solids content of 50.0%, min-U-Sil (trademark) 5 SiO$_2$ powder 70.87% dry weight and 43.94% wet weight, boron silicide powder 4.369% dry weight and 2.709% wet weight, PolarGel bentonite powder (Item# 354) 2.913% dry weight and 1.806% wet weight, and 24.46% water, based on Ludox (trademark) solids content of 50.0%. The pH of example 4 is 8.5±1.0, the specific gravity is 1.59±0.05 and the total solids content is 62.0±0.3%. Example 4 is prepared in the same fashion as example 1.

An example of a refractory application of the present invention involves coating a ceramic firebrick such as a Harbison-Walker Clipper DP super duty firebrick. Harbison-Walker is a subsidiary of ANH Refractories located in Moon Township, Pa. The coating has been applied to the firebrick walls of a furnace that has been in operation for some months. Because of the prior operation, the refractory is free of all volatiles both on the surface, and within the bulk of the material. The surface was swept with a nylon brush to remove loosely bound material from the surface, and the small particle dust is removed from the surface by a compressed air blowgun at 70 psi. The wet admixture described in example 4 was applied by a high-pressure suction feed spray gun with a half (½) inch nozzle at 50 to 70 psi.

An example of a ceramic fabric application involves coating Nextel 440 Cloth, available from TMO Industries, Inc. of Huntington Park, Calif., with the admixture of Example 3. In this application, the substrate is mounted in a wooden frame in order to secure the substrate during the coating process. The coating of Example 3 was applied by the single action Paasche "H" model airbrush with a number "5" fluid nozzle and number "5" air cap. The target coverage density is 200–400 grams dry coating weight per square meter of substrate area.

It is to be understood that the present invention is not limited to the embodiments described above, but encompasses any and all embodiments within the scope of the following claims.

What is claimed is:

1. A thermal protective coating, comprising:

in dry admixture, a. from about 5% to about 35% of colloidal silica, colloidal alumina, or combinations thereof;

b. from about 23% to about 79% of a filler taken from the group consisting of silicon dioxide, aluminum oxide, titanium dioxide, magnesium oxide, calcium oxide, and boron oxide;

c. from about 2% to about 20% of one or more emissivity agents taken from the group consisting of silicon hexaboride, boron carbide, silicon tetraboride, silicon carbide, molybdenum disilicide, tungsten disilicide, zirconium diboride, cupric chromite, and metallic oxides; and d. from about 1.5% to about 5.0% of a stabilizer taken from the group consisting of bentonite, kaolin, magnesium alumina silica clay, tabular alumina, and stabilized zirconium oxide.

2. The coating of claim 1, wherein:

a. the emissivity agents are one or more metallic oxides taken from the group consisting of iron oxide, magnesium oxide, manganese oxide, copper chromium oxide, chromium oxide, cerium oxide, terbium oxide, and derivatives thereof.

3. The coating of claim 1, further comprising:

a. water forming a wet admixture having a total solids content ranges from about 40% to about 70%.

4. The coating of claim 1, wherein:

the dry admixture comprises a. from about 10% to about 30% colloidal silica, b. from about 50% to about 79% silicon dioxide powder, and c. from about 2% to about 15% of one or more emissivity agents taken from the group consisting of iron oxide, boron silicide, boron carbide, silicon tetraboride, silicon carbide molybdenum disilicide, tungsten disilicide, and zirconium diboride; and d. from about 1.5% to about 5.0% of a stabilizer taken from the group consisting of bentonite, kaolin, magnesium alumina silica clay, tabular alumina, and stabilized zirconium oxide.

5. The coating of claim 4, wherein:

a. the stabilizer is bentonite powder.

6. The coating of claim 5, further comprising:

water forming a wet admixture having a total solids content ranges from about 40% to about 70%.

7. The coating of claim 1, further comprising:

a. a colorant.

8. The coating of claim 1, further comprising:

a. a colorant.

9. A thermal protective coating, comprising:
in dry admixture,
a. from about 5% to about 35% of colloidal silica,
b. from about 50% to about 79% of a filler, and
c. from about 2% to about 20% of one or more emissivity agents taken from the group consisting of silicon hexaboride, boron carbide, silicon tetraboride, silicon carbide, molybdenum disilicide, tungsten disilicide, zirconium diboride, cupric chromite, and metallic oxides; and
d. from about 1.5% to about 5.0% of a stabilizer taken from the group consisting of bentonite, kaolin, magnesium alumina silica clay, tabular alumina, and stabilized zirconium oxide.

10. The coating of claim 9, wherein:
a. the emissivity agent is a metallic oxide taken from the group consisting of iron oxide, magnesium oxide, manganese oxide, chromium oxide, copper chromium oxide, cerium oxide, terbium oxide, and derivatives thereof.

11. The coating of claim 9, further comprising:
a. water forming a wet admixture having a total solids content ranges from about 50% to about 65%.

12. The coating of claim 9, wherein:
from about 2% to about 15% of an emissivity agent.

13. The coating of claim 12, wherein:
the emittance agent is taken from the group consisting of boron silicide, boron carbide, silicon carbide, and zirconium boride.

14. The coating of claim 9, wherein:
a. the filler is a metal oxide taken from the group consisting of silicon dioxide, aluminum oxide, titanium dioxide, magnesium oxide, calcium oxide, and boron oxide.

15. The coating of claim 9, further comprising:
a. a colorant.

16. The coating of claim 9, wherein:
a. the stabilizer is bentonite powder.

17. A method of preparing a protective thermal coating for a substrate, comprising the steps of:
a. adding a dry admixture to a mixing container wherein the dry admixture contains
   i. from about 5% to about 35% of colloidal silica, colloidal alumina, or combinations thereof,
   ii. from about 23% to about 79% of a filler, and
   iii. from about 2% to about 20% of one or more emissivity agents taken from the group consisting of silicon hexaboride, boron carbide, silicon tetraboride, silicon carbide, molybdenum disilicide, tungsten disilicide, zirconium diboride, cupric chromite, and metallic oxides; and
   iv. from about 1% to about 5% of a stabilizer taken from the group consisting of bentonite, kaolin, magnesium alumina silica clay, tabular alumina, and stabilized zirconium oxide;
b. adding water to the mixing container so that total solids content of wet admixture ranges from about 40% to about 60%; and
c. mixing the contents of the mixing container thereby forming a protective thermal coating solution.

18. The method of claim 17, wherein
a. the filler is taken from the group consisting of silicon dioxide, aluminum oxide, titanium dioxide, magnesium oxide, calcium oxide, and boron oxide.

19. The method of claim 17, wherein:
a. the emissivity agent is a metallic oxide taken from the group consisting of iron oxide, magnesium oxide, manganese oxide, chromium oxide, copper chromium oxide, cerium oxide, terbium oxide, and derivatives thereof.

20. The method of claim 17, further comprising the steps of:
a. placing liquid ingredients in the mixing container prior to mixing in dry ingredients.

21. The method of claim 17, further comprising the steps of:
a. mixing at high shear until the contents are well dispersed.

22. The method of claim 17, further comprising the steps of:
a. providing a storage container, and
b. placing the thermal protective coating solution in the storage container for future use.

23. The method of claim 22, further comprising the steps of:
a. remixing the thermal protective coating solution in the storage container after storage for current use.

24. The method of claim 17, further comprising the steps of:
a. coating a substrate with the thermal protective coating solution.

25. The method of claim 23, further comprising the steps of:
a. coating a substrate with the thermal protective coating solution.

26. The method of claim 17, further comprising the steps of:
a. curing the coating on the substrate.

27. The method of claim 17, wherein:
a. the dry admixture further comprises a colorant.

28. The method of claim 26, wherein:
a. curing the coating on the substrate, comprises the steps of;
   i. air drying the coating on the substrate for about two hours;
   ii. increasing the temperature of the coated substrate at a rate of about 200° F. per hour until a peak temperature of about 1500° F. is reached;
   iii. maintaining the peak temperature for about two hours; and
   iv. reducing the temperature of the coated substrate to room temperature at a rate of up to about 200° F. per hour.

29. A substrate coated with a thermal protective coating, comprising:
a. a substrate having a thermal protective coating thereon; and
b. the thermal protective coating containing
   i. from about 5% to about 35% of an colloidal silica, colloidal alumina, or combinations thereof,
   ii. from about 23% to about 79% of a filler, and
c. from about 2% to about 20% of one or more emissivity agents taken from the group consisting of silicon hexaboride, boron carbide, silicon tetraboride, silicon carbide, molybdenum disilicide, tungsten disilicide, zirconium diboride, cupric chromite, and metallic oxides; and d. from about 1.5% to about 5.0% of a stabilizer taken from the group consisting of bentonite, kaolin, magnesium alumina silica clay, tabular alumina, and stabilized zirconium oxide.

30. The coated substrate of claim 29, wherein
a. the filler is taken from the group consisting of silicon dioxide, aluminum oxide, titanium dioxide, magnesium oxide, calcium oxide, and boron oxide.

31. The coated substrate of claim 29 wherein:
a. the emissivity agent is a metallic oxide taken from the group consisting of iron oxide, magnesium oxide, manganese oxide, chromium oxide, copper chromium oxide, cerium oxide, terbium oxide, and derivatives thereof.

32. The coated substrate of claim 29, further comprising:
a. a colorant.

* * * * *